US008907887B2

(12) United States Patent
Larson et al.

(10) Patent No.: US 8,907,887 B2
(45) Date of Patent: Dec. 9, 2014

(54) METHODS AND SYSTEMS FOR OPERATING AVIONIC SYSTEMS BASED ON USER GESTURES

(75) Inventors: Brent D. Larson, Cave Creek, AZ (US); John G. Suddreth, Cave Creek, AZ (US); Frank Cupero, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1468 days.

(21) Appl. No.: 12/123,079

(22) Filed: May 19, 2008

(65) Prior Publication Data
US 2009/0284552 A1 Nov. 19, 2009

(51) Int. Cl.
*G09G 5/00* (2006.01)
*G02B 27/01* (2006.01)
(52) U.S. Cl.
CPC ........ *G02B 27/01* (2013.01); *G02B 2027/0187* (2013.01)
USPC ........................................................ 345/156
(58) Field of Classification Search
CPC .................... G02B 27/01–27/0189; G02B 2027/0179–2027/0187; G06F 3/033–3/0346
USPC ............ 345/7–9, 204–215, 87–104, 629–641
See application file for complete search history.

(56) References Cited

U.S. PATENT DOCUMENTS

| 3,719,943 | A * | 3/1973 | Applegarth ..................... 342/47 |
| 5,347,289 | A * | 9/1994 | Elhardt .......................... 342/448 |
| 6,927,694 | B1 * | 8/2005 | Smith et al. .................... 340/576 |
| 7,180,476 | B1 | 2/2007 | Guell et al. |
| 7,180,500 | B2 * | 2/2007 | Marvit et al. .................. 345/156 |
| 7,538,724 | B1 * | 5/2009 | Baillot ...................... 342/357.31 |
| 2002/0158827 | A1 | 10/2002 | Zimmerman |
| 2006/0007020 | A1 * | 1/2006 | Biermann ...................... 340/945 |
| 2006/0197832 | A1 | 9/2006 | Yamada et al. |
| 2006/0214807 | A1 * | 9/2006 | Tengshe et al. ............... 340/576 |
| 2007/0002078 | A1 * | 1/2007 | He et al. ........................ 345/633 |
| 2007/0080828 | A1 * | 4/2007 | He .................................. 340/974 |
| 2007/0296646 | A1 | 12/2007 | Yamamoto et al. |

FOREIGN PATENT DOCUMENTS

| DE | 202004008110 U1 | 8/2004 |
| GB | 2415486 A | 12/2005 |
| JP | 2008033891 | 2/2008 |
| WO | 2005114366 A1 | 12/2005 |

OTHER PUBLICATIONS

EP Search Report, EP 09159829.2-1524/2124088 dated Mar. 2, 2012.
EP Communication, EP 09159829.2-1524 dated Oct. 2, 2012.

* cited by examiner

*Primary Examiner* — Patrick F Marinelli
(74) *Attorney, Agent, or Firm* — Ingrassia Fisher & Lorenz, P.C (57) ABSTRACT

Methods and systems for operating an avionics system are provided. A predefined set of movements of a headset is detected. In response to the detection of the set of movements, one or more various functions are performed.

21 Claims, 8 Drawing Sheets

METHODS AND SYSTEMS FOR OPERATING AVIONIC SYSTEMS BASED ON USER GESTURES

TECHNICAL FIELD

The present invention generally relates to avionic systems, and more particularly relates to methods and systems for operating an avionic system based on gestures of a user, such as a pilot.

BACKGROUND

Modern vehicles, such as aircraft, often include head-up displays (HUDs) that project various symbols and information onto a transparent display, or image combiner, through which a user (e.g., the pilot) may simultaneously view the exterior scene. Traditional HUDs incorporate fixed image combiners located above the instrument panel on the windshield of the aircraft, or directly between the windshield and the pilot's head.

More recently, "head-mounted" HUDs have been increasingly developed that utilize image combiners, such as near-to-eye (NTE) displays, coupled to the helmet or headset of the pilot that move with the changing position and angular orientation of the pilot's head. Although an advantage of head-mounted HUDs is that the information displayed may be visible to the pilot regardless of the position or orientation of his or her head, there may circumstances in which the pilot would prefer that the information on the NTE display not be visible, such as when the pilot is attempting to view the terrain with as little visible obstruction as possible, or when the pilot is viewing a display on the instrument panel (i.e., a "head-down" display). Typically, the only way for the pilot to deactivate the HUD is to manually actuate a user input device (e.g., a switch) on the flight deck of the aircraft, which may be distracting and typically requires the pilot to release the flight controls with at least one hand.

In this sense, traditional HUDs utilizing fixed image combiners offer the advantage that the information displayed is typically only visible when the pilot's head is directly in front of the image combiner. That is, if the pilot leans to the side to look around the image combiner, or looks down at the instrument panel, the information on the HUD is no longer visible.

Additionally, there are situations in which it would be advantageous for the pilot to have the ability to control other systems on-board the aircraft without requiring the manual actuation of a user input device. Further, there are situations in which it would be advantageous for the aircraft to automatically respond to the pilot's behavior.

Accordingly, it is desirable to provide a method and system for operating an avionic system based on gestures of a user. Furthermore, other desirable features and characteristics of the present invention will become apparent from the subsequent detailed description of the invention and the appended claims, taken in conjunction with the accompanying drawings and this background of the invention.

BRIEF SUMMARY

A method for operating an avionics system including a headset and a head-up display (HUD) device is provided. An initial position-orientation of the headset when the HUD device is in a first state of operation is detected. A predefined set of movements of the headset is detected. The predefined set of movements of the headset begins at the initial position-orientation. In response to the detection of the predefined set of movements, the HUD device is switched from the first state of operation to a second state of operation. The HUD device is caused to remain in the second state of operation if the headset returns to the initial position-orientation.

A method for operating an avionics system including a headset and a head-up display (HUD) device is provided. First and second sets of movements of the headset are defined. An initial position-orientation of the headset when the HUD device is in a first state of operation is detected. The first set of movements of the headset is detected. The first set of movements of the headset originates at the initial position-orientation. In response to the detection of the first set of movements, the HUD device is switched from the first state of operation to a second state of operation. The HUD device is caused to remain in the second state of operation if the headset returns to the initial position-orientation without undergoing the second set of movements. The second set of movements of the headset is detected. In response to the detection of the second set of movements, the HUD device is switched from the second state of operation to a third state of operation.

A method for operating an avionics system including a headset is provided. A predefined set of movements of the headset is detected. An audio communication is generated in response to said detection of the predefined set of movements of the headset.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, and brief summary or the following detailed description. It should also be noted that FIGS. 1-8 are merely illustrative and may not be drawn to scale. Additionally, in several of the drawings, a Cartesian coordinate system, including x, y, and z axes and/or directions (or pitch, roll, and/or yaw axes), is shown to clarify the relative orientation of the components, according to the various embodiments. However, this coordinate system is only intended to assist in the explanation of various aspects of the present invention, and should be not construed as limiting.

FIG. 1 to FIG. 8 illustrate methods and systems for operating an avionics system. In one embodiment, the avionics system includes a headset and a head-up display (HUD). An initial position and/or angular orientation (i.e., position-orientation) of the headset is detected when the HUD device is in a first state of operation (or operational state). A predefined set of movements (spatial and/or angular) of the headset is detected. The predefined set of movements of the headset begins at the initial position-orientation. In response to the detection of the predefined set of movements, the HUD device is switched from the first state of operation to a second state of operation. The HUD device is caused to remain in the second state of operation if the headset returns to the first position-orientation. The switching of the state of operation of the HUD device may include activating and/or deactivating at least a portion of an image rendered on the HUD device.

In another embodiment, the avionics system includes a headset. A predefined set of movements of the headset is detected. An audio communication is generated in response to said detection of the predefined set of movements of the headset. The predefined set of movements may be indicative of, for example, a state of distress or behavior of a user wearing the headset.

Figure 1:
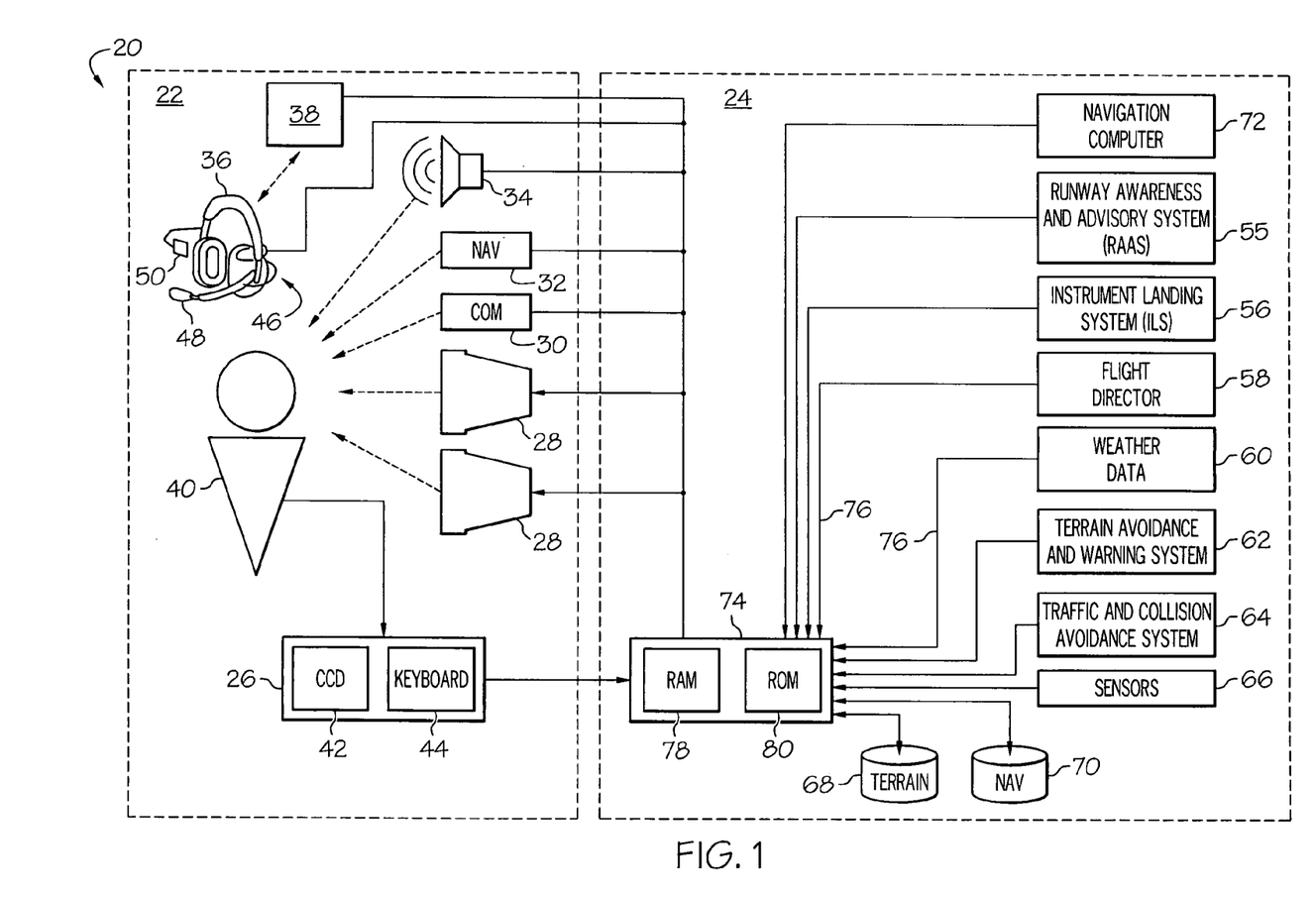
FIG. 1 is a schematic block diagram of an aircraft, according to one embodiment of the present invention.

FIG. 1 schematically illustrates a vehicle 20, such as an aircraft, according to one embodiment of the present invention. The vehicle 20 may be, in one embodiment, any one of a number of different types of aircraft such as, for example, a private propeller or jet engine driven airplane, a commercial jet liner, or a helicopter. In the depicted embodiment, the vehicle 20 includes a flight deck 22 (or cockpit) and an avionics/flight system 24. Although not specifically illustrated, it should be understood that the vehicle 20 also includes a frame or body to which the flight deck 22 and the avionics/flight system 24 are connected, as is commonly understood. It should also be noted that vehicle 20 is merely exemplary and could be implemented without one or more of the depicted components, systems, and data sources. It will additionally be appreciated that the vehicle 20 could be implemented with one or more additional components, systems, or data sources.

The flight deck 22 includes a user interface 26, display devices 28 (e.g., a primary flight display (PFD)), a communications radio 30, a navigational radio 32, an audio device 34, a headset 36, and a head (and/or eye) motion tracker 38.

The user interface 26 is configured to receive input from a user 40 (e.g., a pilot) and, in response to user input, supply command signals to the avionics/flight system 24. The user interface 26 may include flight controls (not shown) and any one of, or combination of, various known user interface devices including, but not limited to, a cursor control device (CCD), such as a mouse, a trackball, or joystick, and/or a keyboard, one or more buttons, switches, or knobs. In the depicted embodiment, the user interface 26 includes a CCD 42 and a keyboard 44. The user 40 uses the CCD 42 to, for example, move a cursor symbol on the display devices 28, and use the keyboard 44 to, for example, input textual data.

Still referring to FIG. 1, the display devices 28 are used to display various images and data, in graphic, iconic, and/or textual formats, and to supply visual feedback to the user 40 in response to the user input commands supplied by the user 40 to the user interface 26. It will be appreciated that the display devices 28 may each be implemented using any one of numerous known displays suitable for rendering image and/or text data in a format viewable by the user 40, such as a cathode ray tube (CRT) displays, a LCD (liquid crystal display), or a TFT (thin film transistor) displays. The display devices 28 may also be implemented on the flight deck 22 as "head-down" displays or a head-up display (HUD) projected on a fixed image combiner.

The communication radio 30 is used, as is commonly understood, to communicate with entities outside the vehicle 20, such as air-traffic controllers and pilots of other aircraft. The navigational radio 32 is used to receive from outside sources and communicate to the user various types of information regarding the location of the vehicle, such as Global Positioning Satellite (GPS) system and Automatic Direction Finder (ADF) (as described below). The audio device 34 is, in one embodiment, an audio speaker mounted within the flight deck 22.

The headset 36 includes an interconnected combination of earphones 46, a microphone 48, and a near-to-eye (NTE) display (or display screen) 50. The earphones 46 may substantially form a frame for the headset 36 and be configured to be removably worn by the pilot. The earphones 46 and the microphone 48 may be in operable communication with the communications radio 30, and the NTE display may be in operable communication with the avionics system 24, as described below. The NTE display 50 may be adjustably suspended from the earphones 46 such that the display 50 may positioned directly in front of an eye of the user 40 while the headset 36 is worn, as is commonly understood. In one embodiment, the NTE display 50 is an image combiner (i.e., a substantially transparent plate), as is commonly understood. The NTE display 50 may also be, for example, a flat panel display screen, such as an LCD display screen. Although not shown, the headset 36 may also include an eye motion detector to detect movement of the eye of the user relative to the user's head. Additionally, the headset 36 may include various hardware, such as inertial sensors, to detect movements of the user's head. It should also be noted that the flight deck 22 may define an "operational range limit" of the headset 36, and in particular, of the NTE display 50. That is, the headset 36 and the NTE display 50 may not be able to operate properly and/or communicate the other components of the aircraft 20 if removed from the operational range limit (e.g., because the headset becomes "unplugged.")

Figure 2:
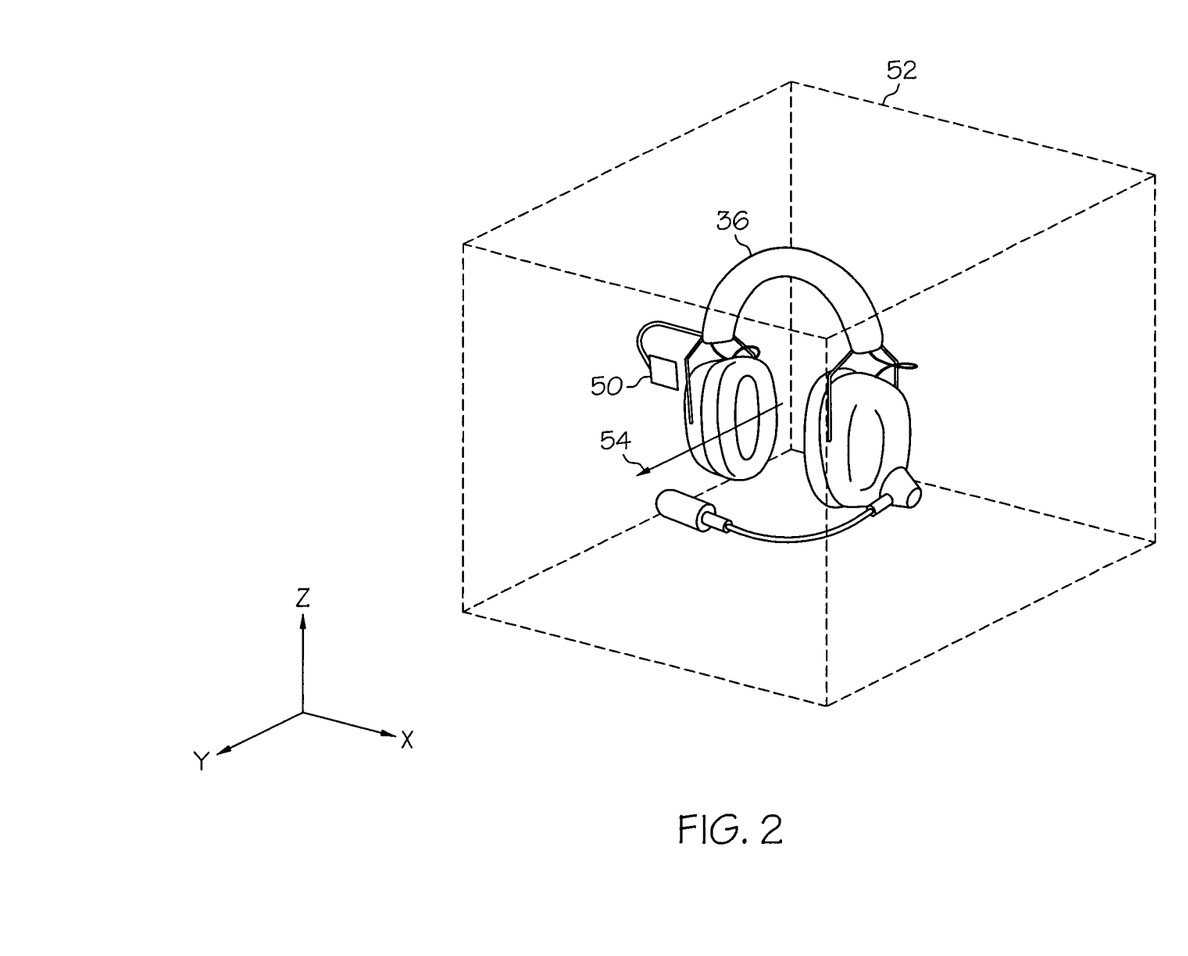
FIG. 2 is an isometric view of a headset on-board the aircraft of FIG. 1, including a near-to-eye (NTE) display, in an initial position-orientation.

The motion tracker 38 is configured to detect (either solely or in combination with the hardware in the headset 36) movements (i.e., position and angular orientation) of the pilot's head, the headset 36 as a whole, and/or the NTE display 50. Although not shown, the motion tracker 38 may utilize various methods to determine the movements of the headset 36 including optical and/or infrared components and inertial sensors located within the headset 36. Referring to FIGS. 1 and 2, the motion tracker 38 and/or the headset 36 (and/or the processor described below) may determine the position and angular orientation (i.e., position-orientation) of the headset 36 relative to the Cartesian coordinate system shown. To illustrate the movements of the headset 36 described below, a movement box 52 has been drawn about the headset 36. Additionally, an arrow 54 is shown as originating from a central portion of the headset 36 to indicate changes in the angular orientation of the headset 36. In particular, the arrow 54 may indicate a central axis of a field of view of the pilot 40 (FIG. 1). FIG. 2 illustrates the headset 36 in a "central" (or initial) position, both spatially and angularly, within the movement box 52 in which the pilot may be looking "directly ahead" (i.e., towards/over the front of the aircraft 20) and the pilot's head is substantially centered over his/her seat (not shown).

As shown in FIG. 1, the avionics/flight system 24 includes a runway awareness and advisory system (RAAS) 55, an instrument landing system (ILS) 56, a flight director 58, a weather data source 60, a terrain avoidance warning system (TAWS) 62, a traffic and collision avoidance system (TCAS) 64, a plurality of sensors 66 (e.g., a barometric pressure sensor, a thermometer, and a wind speed sensor), one or more terrain databases 68, one or more navigation databases 70, a navigation and control system (or navigation computer) 72, and a processor 74. The various components of the avionics/flight system 24 are in operable communication via a data bus 76 (or avionics bus). Although not illustrated, the navigation and control system 72 may include a flight management system (FMS), a control display unit (CDU), an autopilot or automated guidance system, multiple flight control surfaces (e.g., ailerons, elevators, and a rudder), an Air Data Computer (ADC), an altimeter, an Air Data System (ADS), a Global Positioning Satellite (GPS) system, an automatic direction finder (ADF), a compass, at least one engine, and gear (i.e., landing gear).

The processor 74 may be any one of numerous known general-purpose controller or an application specific processor that operates in response to program instructions, such field programmable gate arrays (FPGAs), application specific integrated circuits (ASICs), discrete logic, microprocessors, microcontrollers, and digital signal processors (DSPs), or combinations thereof. In the depicted embodiment, the processor 74 includes on-board RAM (random access memory) 78 and on-board ROM (read only memory) 80. The program instructions that control the processor 74 may be stored in either or both the RAM 78 and the ROM 80. For example, the operating system software may be stored in the ROM 80, whereas various operating mode software routines and various operational parameters may be stored in the RAM 78. The RAM 78 and/or the ROM 80 may include instructions stored thereon for carrying out the methods and processes described below. It will be appreciated that this is merely exemplary of one scheme for storing operating system software and software routines, and that various other storage schemes may be implemented. It will also be appreciated that the processor 74 may be implemented using various other circuits, not just a programmable processor. For example, digital logic circuits and analog signal processing circuits could also be used.

During operation of the aircraft 20, the headset 36 is worn by the pilot 40 (or other user), and the earphones 46 and the microphone 48 are used to communicate with ground personnel, as well as other aircraft. Additionally, the NTE display 50 is adjusted such that it is positioned directly in front of one of the user's 40 eyes.

Figure 3:
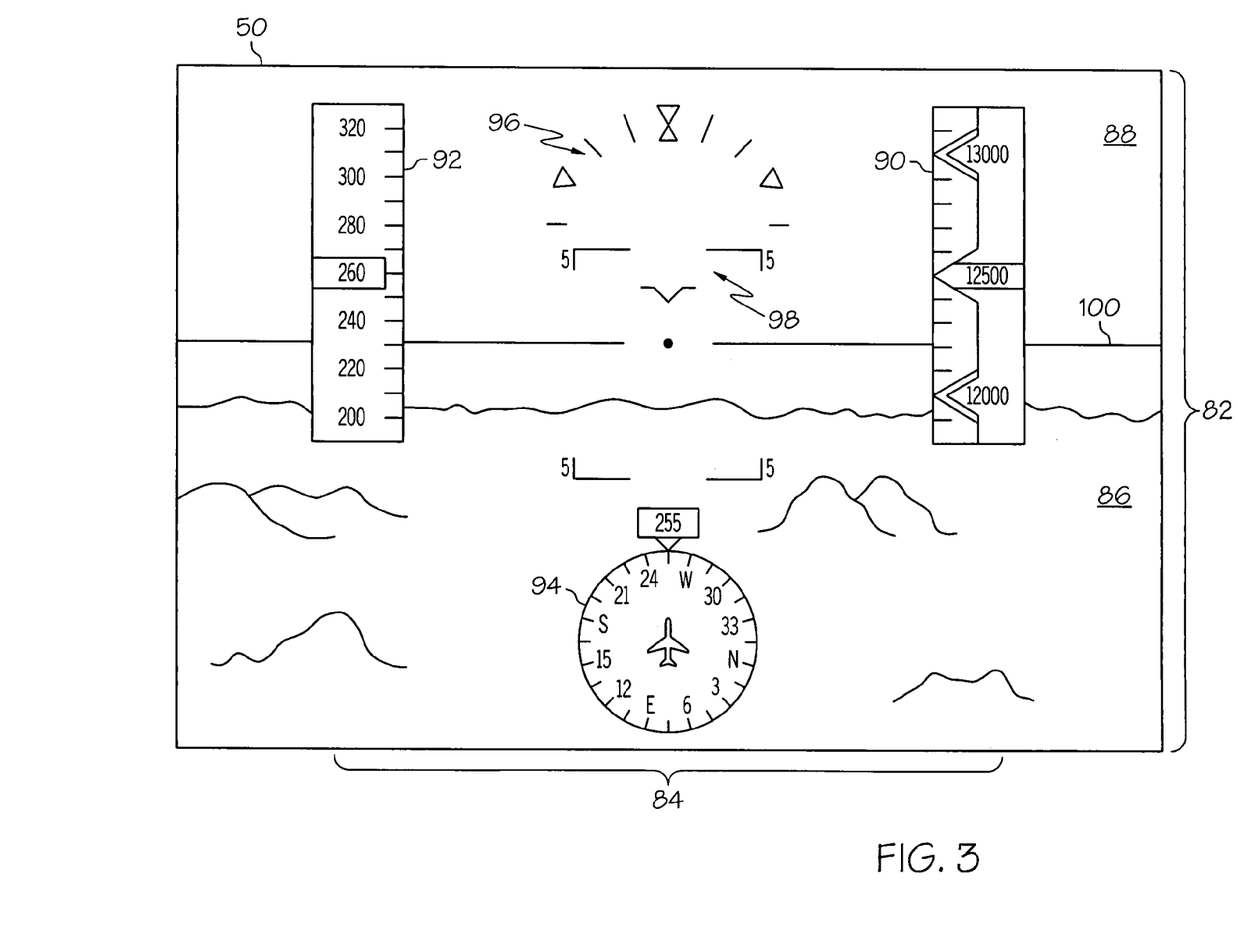
FIG. 3 is a plan view of the NTE display with a symbology image rendered thereon.

FIG. 3 illustrates the NTE display 50 during operation. On the NTE display 50 are shown a terrain image 82 and a symbology image (or simply "symbology") 84. The terrain image 82 is at least representative of the pilot's view from the flight deck 22. In the exemplary embodiment shown in FIG. 3, the terrain image 82 depicts a perspective view from the aircraft 20 of the terrain outside the aircraft 20 and covers substantially the entire display 50. The terrain image 82 includes a terrain portion 86 and a sky portion 88. As is commonly understood, in an embodiment in which the display 50 is an image combiner, the terrain image 82 is simply the pilot's 40 view of the terrain (and/or the interior of the flight deck 22) as seen through the NTE display 50. While in an embodiment in which the NTE display 50 is, for example, an LCD display, the terrain image 82 is generated based on multiple readings from various instruments onboard the aircraft 20 that provide a current position and/or orientation (e.g., heading) of the aircraft 20 and changes as the position and/or orientation of the aircraft 20 changes, as well as the terrain and navigational databases 68 and 70 (FIG. 1). As indicated on FIG. 3, terrain features (e.g., hills, mountains, valleys, etc.) may be shown on the terrain image 82 to assist the user 40 with the operation of the aircraft 20.

Still referring to FIG. 3, the symbology 84 is displayed over terrain image 100. The symbology 84 includes multiple digital instruments, such as an altitude indicator 90, an airspeed indicator 92, a heading indicator 94, a roll indicator 96, and a pitch indicator 98. In the embodiment illustrated, the altitude indicator 90 and the airspeed indicator 92 are displayed as an altitude "tape" and an airspeed tape, respectively, as is commonly understood. The heading indicator 94 is graphically displayed as a compass at a lower center portion of the display 50. The roll indicator 96 is displayed above the heading indicator 94 at an upper portion of the display 50, and the pitch indicator 98 is positioned between the heading indicator 94 and the roll indicator 96. The digital instruments 90-98 provide information regarding a current state of the aircraft, including an indication of a position and/or orientation (i.e., heading, pitch, roll, etc.) of the aircraft 20 to the user 40. As shown, the NTE display 50 also includes a horizon bar 100, which may be considered to be part of neither the terrain image 82 nor the symbology image 84. The horizon bar 100 extends horizontally near the center of the screen 50, through the pitch indicator 98.

In one embodiment, an operational state of the NTE display 50 is controlled based on predefined sets of movements of the headset 36 (and/or the pilot's head and/or the NTE display 50). That is, various gestures, or movements, of the pilot's head are stored in memory on the aircraft 20, and when a particular gesture is detected by the motion tracker 38, the operational state of the NTE display 50 is altered (e.g., from a first operational state to a second operational state).

Figure 4:
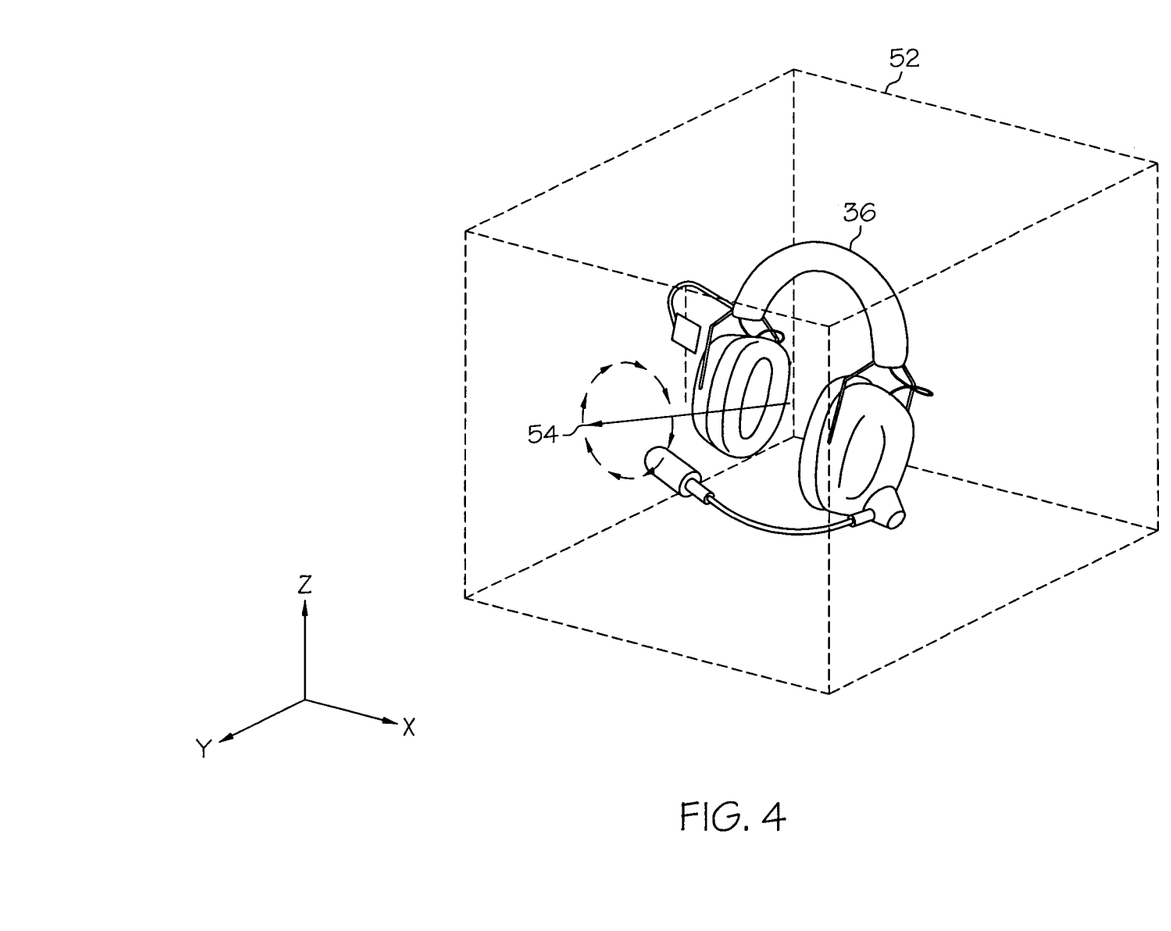
FIG. 4 is an isometric view of the headset of FIG. 2 undergoing a first set of movements.
Figure 5:
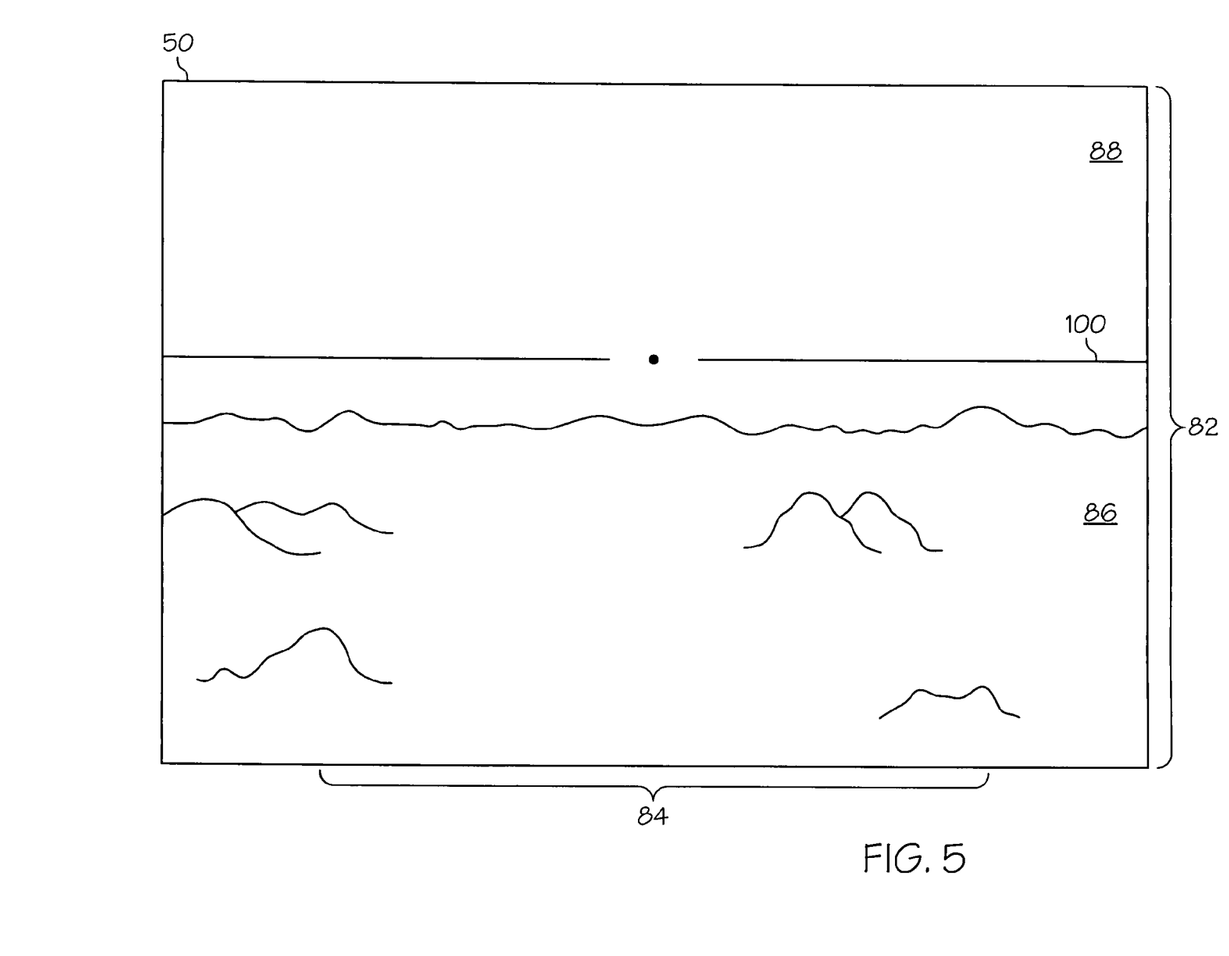
FIG. 5 is a plan view of the NTE display of FIG. 3 with the symbology image deactivated.

For example, as shown in FIGS. 4 and 5, a predefined set of movements (i.e., at least one spatial and/or angular) of the headset 36, in one embodiment, deactivates the symbology image 84 shown on the NTE display 50. Referring specifically to FIG. 4, the headset 36 is moved in a manner consistent with the pilot "moving his/her head in a circle." That is, the headset 36, beginning at the initial position (FIG. 2), is primarily rotated about the x-axis and the z-axis such that the tip of the arrow 54 is moved in a counterclockwise direction, as viewed by the pilot, one or more times (e.g., three times). Detection of this motion by the motion tracker 38 causes the motion tracker 38 to send an appropriate signal to the processor 74. The processor 74 then deactivates the symbology image 84 (or a portion of the symbology image 84) on the NTE display 50 as shown in FIG. 5.

Figure 6:
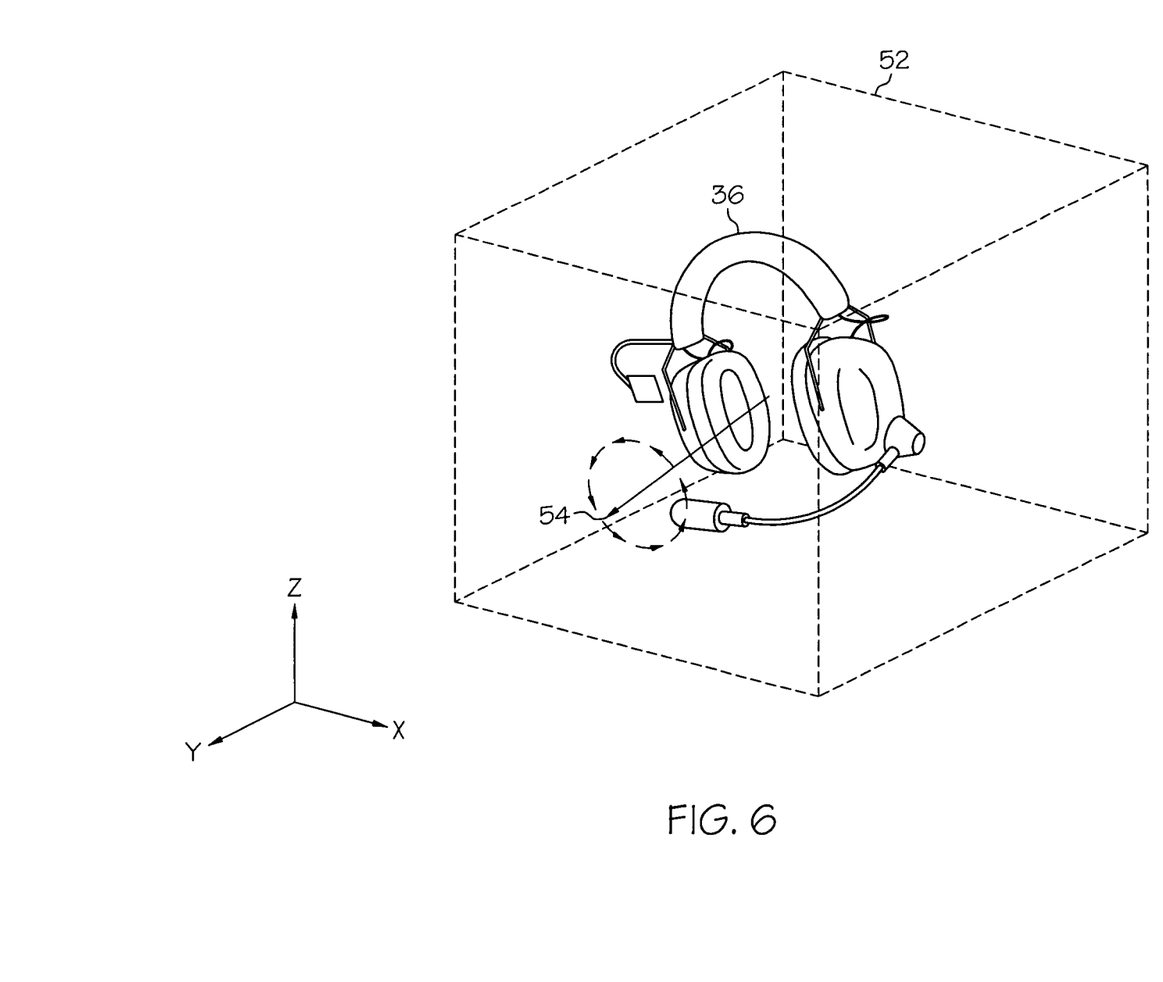
FIG. 6 is an isometric view of the headset of FIG. 2 undergoing a second set of movements.

In one embodiment, the pilot 40 may reverse the change in operational state of the NTE display 50 by moving his/her head such that the headset 40 undergoes a second set of movements. For example, FIG. 6 illustrates the headset 36 being moved in a manner consistent with the pilot moving his/her head in a circle opposite that shown in FIG. 4. That is, the headset 36 is primarily rotated about the x-axis and the z-axis such that the tip of the arrow 54 is moved in a clockwise direction, as viewed by the pilot, one or more times (e.g., three times). Detection of this movement of the headset 36 by the motion tracker 38 causes the symbology image 84 (or the deactivated portions of the symbology image 84) to be reactivated (i.e., switched to a third operational state, which may be the same as the first operational state), returning the NTE display 50 to its operational state shown in FIG. 3.

It should be noted that once the first set of movements is detected and the NTE display is switched to the second operational state, the NTE display does not return to the first operational state until the second set of movements of the headset 36 is detected, even if the headset 36 is returned to the initial position (FIG. 2). As such, after the NTE is switched to the second operational state, the pilot 40 may resume normal use of the headset 36 as the second set of movements (as well as the first set of movements) are sufficiently complex and obscure that it is unlikely that the pilot 40 will accidentally perform such a gesture.

Although not illustrated, other sets of movements, or gestures, may trigger other changes in the operational state of the NTE display 50. For example, one gesture may activate and/or deactivate the displaying of enhanced flight vision system (EVS) features, as is commonly understood, on the NTE display 50. Other gestures may also be used to perform other functions, such as locking in the current display image, much like a screen capture. The pattern recognition algorithms used by the motion tracker 38 may start with baseline patterns but refine, adapt, or even learn new gestures which are user-dependent. Spoken commands for the display control may also be used in combination with the gestures.

The sets of movements may also include movements of the headset 36 other than rotations about the x, y, and z axes, such as translations along the x, y, and z axes. Additionally, the gestures may be used to activate features other than switching the operational state of the NTE display 50.

In one embodiment, the processor 74 of FIG. 1 is used to analyze the output data from the motion tracker 38, which in this embodiment contains both positional and orientational coordinates, with up to a total of six independent degrees of freedom, as is well understood. The processor 74 mathematically transforms the input set of independent degrees of freedom into a dependent data set described by fewer degrees of freedom than the input set. The processor 74 then performs pattern matching or other analysis on this reduced data set. This simplifies the pattern matching task while allowing multiple head motion patterns to represent equivalent gestures.

Using FIGS. 4 and 6 as examples, up to six independent degrees of freedom are tracked, whereas the gestures, represented by the clockwise and counterclockwise circles, are two dimensional (two degrees of freedom). While pattern matching may be performed on all six coordinates, many matching patterns may be tested in order to generate a robust algorithm. For example, equivalent circular patterns may be made using only positional movement without turning the head, or alternately, by rotations alone about fixed rotational axes location. The transformation applied in this embodiment maps the six degrees of freedom, three positional and three rotational (each about a relative axis) onto a symbol plane in front of the head or headset. In this specific embodiment, the symbol plane is chosen to be normal to the forward line of sight from the original position detected.

That is, even though the system recognizes movement amongst six degrees of freedom (and in three dimensions), the movements may be reduced to only two-dimensional motion for the purposes of pattern recognition. As such, the two-dimensional circles shown in FIGS. 4 and 6 may represent "patterns" that the system recognizes as a trigger for a particular function. However, these two-dimensional circle patterns may be generated by the user moving his or her head positionally in a circle, "angularly" in a circle, or a combination of the two (i.e., in three dimensions).

In this way, effective and robust pattern recognition is facilitated. Following this transformation, further calculation within the processor 74 is used to complete the recognition sequence, as is well known in the art. Alternate symbol planes may be used. For example, in FIG. 4 the plane may be considered to be the front surface of the movement box 52. Alternately, the symbols may be non-planar or have higher dimensionality. One intuitive visualization of the resultant symbol is provided by having a symbol plane intersect a straight line extending forward from the nose of the pilot or other display user.

It should be understood that the pattern recognition analysis may occur on any combination of one or more of the defined six degrees of freedom: yaw, pitch, or roll rotation or x, y, or z motion. A pattern may be detected in one axis or position, or two or more axes or positions.

When used in combination with an eye tracker there may be additional axes or positions in which the pattern recognition could be analyzed (i.e., more than six degrees of freedom). For example, when the head is tilted upwards while the eye is looking downwards, in a manner similar to someone looking through reading glasses, the display may be visable, otherwise it may not be.

One advantage of the method and system described above is the user is provided with a way to rapidly deactivate the symbology on the NTE display in the event that he or she wishes to view the exterior, or the interior, of the aircraft with a reduced amount of obstruction. Another advantage is that the user is able to switch the state of operation of the NTE display without requiring a manual actuation of any controls on the flight deck.

In another embodiment, the gestures are used to activate audio communications, such as a radio communication or an audible message within the flight deck 22.

Figure 7:
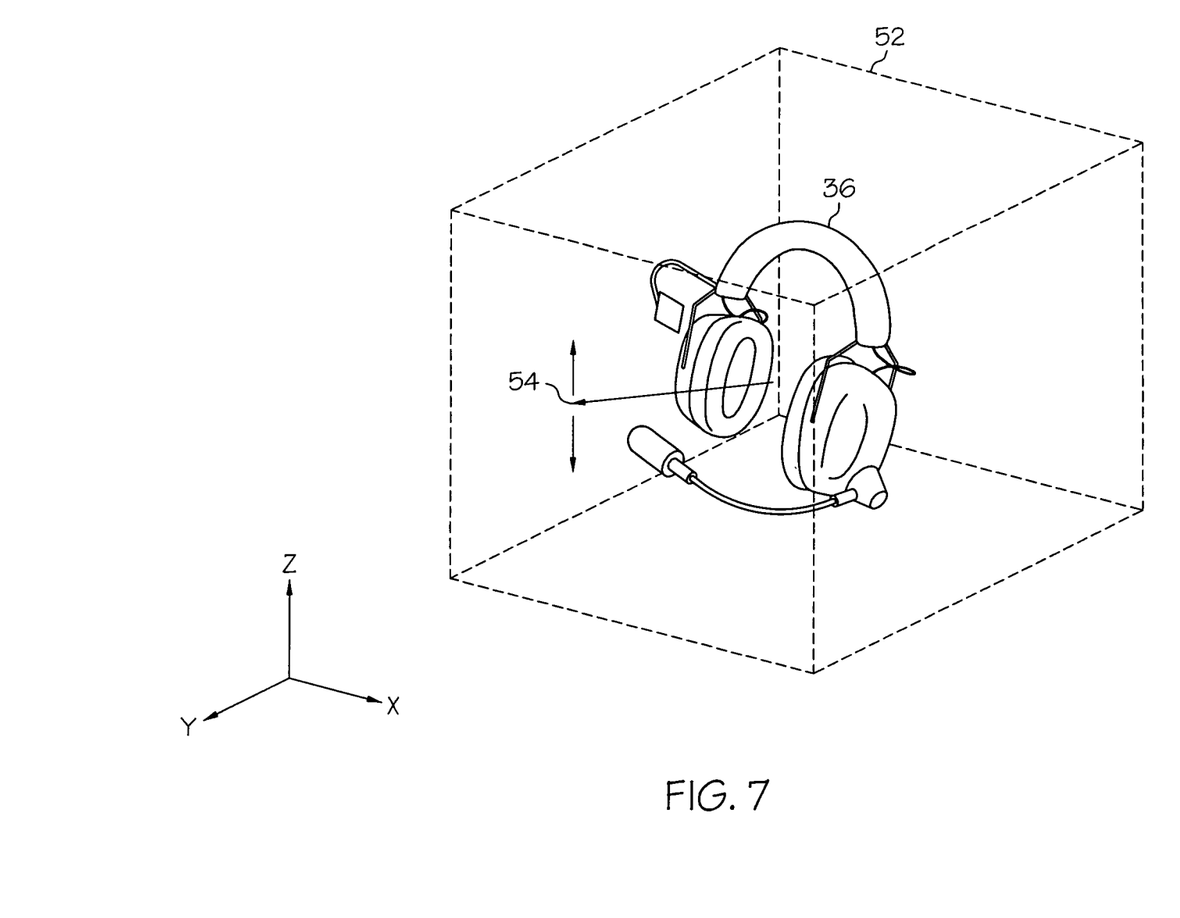
FIG. 7 is an isometric view of the headset of FIG. 2 undergoing a set of movements according to another embodiment of the present invention.

FIG. 7 illustrates a gesture of the headset 36 used to activate a radio communication, according to one embodiment of the present invention. Although not shown in detail, the headset 36 is rotated substantially about the x-axis such that the tip of the arrow 54 is moved upwards and downwards (i.e., the pilot 40 nods his/her head) in a selected rhythm. In one exemplary embodiment, the movement includes three relatively short and quick nods, followed by three longer and slower nods, and completed with three additional short, quick nods. Such a set of movements may be expressed as three short marks followed by three long marks and then three shorts marks, as described relative to Morse code. Such a series of marks in Morse code is internationally recognized as a distress signal. As such, in one embodiment, the set of movements described above is used to cause the communications radio 30 (FIG. 1) to send, for example, a pre-recorded radio communication to ground personnel and/or other aircraft indicating the aircraft 20 is in distress. Of particular interest in this embodiment is that the pilot 40 has the ability to send such a distress signal without having to speak into the microphone 48 (FIG. 1) or manually actuate any controls on the flight deck 22. Thus, such a radio communication may be referred to as a "silent radio communication."

Figure 8:
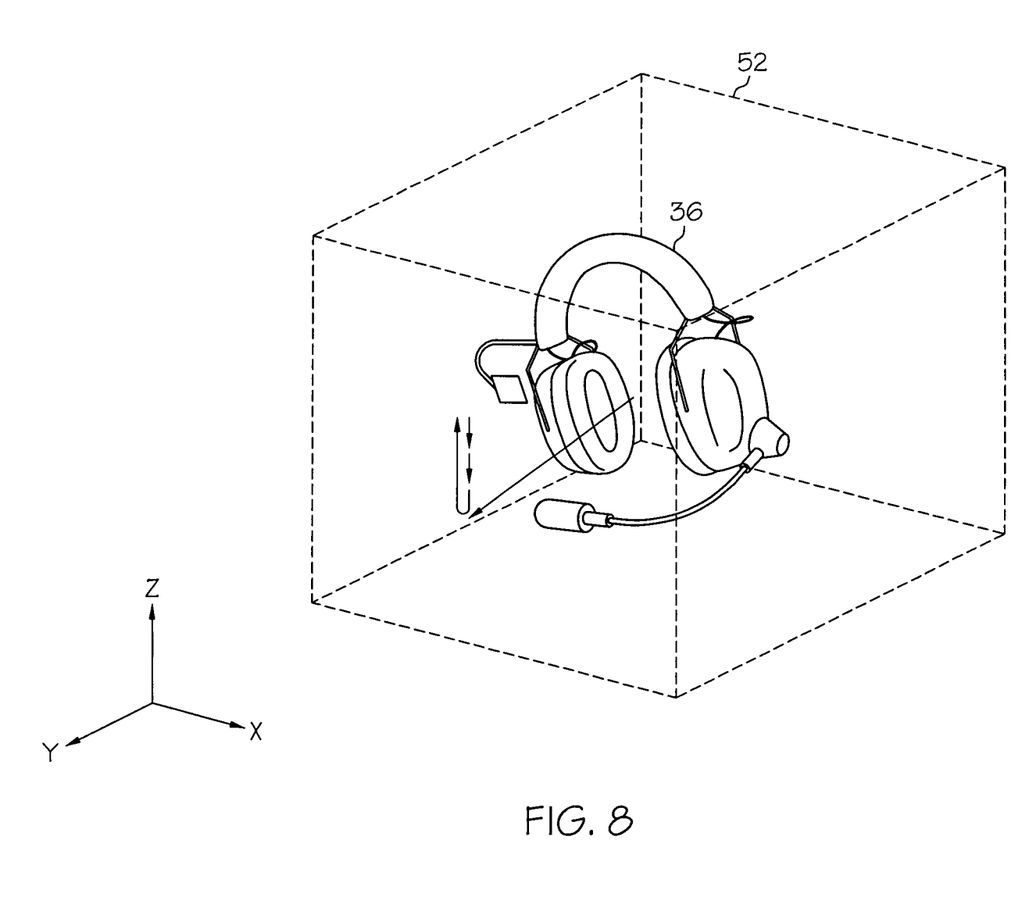
FIG. 8 is an isometric view of the headset of FIG. 2 undergoing a set of movements according to a further embodiment of the present invention.

FIG. 8 illustrates a set of movements of the headset 36 used to activate an audible alert on the flight deck 22, according to another embodiment of the present invention. Although not shown in detail, the headset is rotated substantially about the x-axis such that the tip of the arrow 54 is moved downwards (e.g., from the initial position shown in FIG. 2) and upwards in a selected rhythm. In one exemplary embodiment, the movement includes a series of relatively long and slow downward nods, each followed by a faster, more abrupt upwards nod. A series of such movements of the headset 36 detected by the motion tracker 38 (FIG. 1) within a predetermined amount of time may indicate that the pilot 40 is fatigued. That is, the movements described above may indicate that the pilot is falling asleep. As such, in one embodiment, the set of movements described above is used to cause the audio device 34 (and/or the earphones 46) to generate an audible signal to alert the pilot 40 of the gestures detected by the motion tracker 38. For example, the audio device 34 may generate the sound of a pre-recorded warning or alarm. Thus, the pilot 40 may be warned of his or her apparent state of fatigue.

In one embodiment, the system, or more specifically the processor 74, may establish or "learn" typical head motion rates, patterns, and/or accelerations for the user 40. Subsequent motion may continue to be analyzed to generate one or more numerical metrics which compare motion to the previously determined "typical" motion. This or other head movement algorithms could alert the pilot and/or co-pilot to impending drowsiness and suggest standing, walking, or other stimulating activity. In addition to visual or audio cues, a physical stimulus, such as vibration or other mechanism, may be applied if the tracker data is indicative of continued concern. With suitable processing algorithms, the system may distinguish between situations best handled locally and those which warrant notification of others, for example nearby flight crew, air traffic control, or other authorities, such as medical or security concerns.

Other embodiments may utilize the method and system described above on vehicles other than aircraft, such as land vehicles and watercraft. The method and system may also be used on unmanned vehicles, in which the operational range limit corresponds to station where a user remotely controls the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for operating an avionics system comprising a headset and a head-up display (HUD) device in an aircraft, the method comprising:
   determining when the headset is in a specific starting position at a predetermined position in the aircraft and when the headset is in a specific starting orientation when the HUD device is in a first state of operation;
   determining when the headset is moved starting from the specific starting position and the specific starting orientation in the aircraft according to a predefined set of movements;
   switching, only in response to the determining when the headset is moved starting from the specific starting position and the specific starting orientation in the aircraft according to the predefined set of movements, the HUD device from the first state of operation to a second state of operation; and
   causing the HUD device to remain in the second state of operation when the headset returns to the predetermined position and predetermined orientation;
   wherein determining when the headset is moved starting from the specific starting position and the specific starting orientation in the aircraft according to the predefined set of movements further comprises:
      receiving, from a motion tracker, position coordinates and orientation coordinates having a first number of degrees of freedom;
      transforming the position coordinates and orientation coordinates having the first number of degrees of freedom to a data set having a second number of degrees of freedom, the second number of degrees of freedom having fewer degrees of freedom than the first number of degrees of freedom; and
      determining when the headset is moved starting from the specific starting position and the specific starting orientation in the aircraft according to the predefined set of movements based upon the data set having the second number of degrees of freedom.

2. The method of claim 1, further comprising:
   detecting a second predefined set of movements of the headset; and
   in response to said detection of the second predefined set of movements, switching the HUD device from the second state of operation to a third state of operation.

3. The method of claim 2, further comprising:
   causing at least one image to be rendered on the on the HUD device; and
   wherein said switching of the state of operation from the first state of operation to the second state of operation of the HUD device causes at least a portion of the at least one image to be deactivated.

4. The method of claim 3, wherein the third state of operation is the same as the first state of operation.

5. The method of claim 4, wherein the second predefined set of movement is substantially opposite the predefined set of movements.

6. The method of claim 5, wherein the HUD device is operable within an operational range limit on-board the aircraft and the initial position-orientation is within the operational range limit.

7. The method of claim 6, wherein the HUD device is a near-to-eye (NTE) display device coupled to the headset.

8. The method of claim 1, wherein the first number of degrees of freedom is six and the second number of degrees of freedom is two.

9. A method for operating an avionics system comprising a headset and a head-up display (HUD) device in an aircraft, the method comprising:
   defining first and second sets of movements of the headset;
   detecting when the headset is in a predetermined position and a predetermined orientation in the aircraft when the HUD device is in a first state of operation;
   detecting the first set of movements of the headset, the first set of movements of the headset originating at the predetermined position and the predetermined orientation in the aircraft;
   switching, only in response to said detection of the first set of movements starting from the predetermined position and the predetermined orientation in the aircraft, the HUD device from the first state of operation to a second state of operation;
   causing the HUD device to remain in the second state of operation when the headset returns to the predetermined position and predetermined orientation without undergoing the second set of movements;
   detecting the second set of movements of the headset; and
   in response to said detection of the second set of movements, switching the HUD device from the second state of operation to a third state of operation;
   wherein detecting the first set of movements of the headset and the second set of movements of the headset further comprises:
      receiving, from a motion tracker, position coordinates and orientation coordinates having a first number of degrees of freedom;

transforming the position coordinates and orientation coordinates having the first number of degrees of freedom to a data set having a second number of degrees of freedom, the second number of degrees of freedom having fewer degrees of freedom than the first number of degrees of freedom;

detecting the first set of movements of the headset based upon the data set having the second number of degrees of freedom; and detecting the second set of movements of the headset based upon the data set having the second number of degrees of freedom.

10. The method of claim 9, wherein the first and second set of movements comprise at least one of a spatial movement and an angular movement.

11. The method of claim 10, further comprising:

causing a first image to be displayed on the HUD device, the first image being at least representative of a field of view from on-board the aircraft; and rendering a second image over the first image on the HUD device.

12. The method of claim 11, wherein said switching of the state of operation from the first state of operation to the second state of operation of the HUD device causes at least a portion of the second image to be deactivated.

13. The method of claim 12, wherein the second image comprises symbology indicative of a current state of the aircraft.

14. The method of claim 13, wherein the HUD device is a near-to-eye (NTE) display device coupled to the headset.

15. A method for operating an avionics system comprising a headset, the method comprising:

detecting when the headset is in a predetermined position and a predetermined orientation in an aircraft;

detecting a predefined set of movements of the headset beginning at the predetermined position and the predetermined orientation in the aircraft; and generating an audio communication only in response to said detection of the predefined set of movements of the headset beginning at the predetermined position and predetermined orientation;

wherein detecting the predefined set of movements of the headset beginning at the predetermined position and the predetermined orientation in the aircraft further comprises:

receiving, from a motion tracker, position coordinates and orientation coordinates having a first number of degrees of freedom;

transforming the position coordinates and orientation coordinates having the first number of degrees of freedom to a data set having a second number of degrees of freedom, the second number of degrees of freedom having fewer degrees of freedom than the first number of degrees of freedom; and detecting the predefined set of movements of the headset based upon the data set having the second number of degrees of freedom.

16. The method of claim 15, wherein the audio communication is generated by at least one of a transmitter and an audio device located on-board the aircraft.

17. The method of claim 16, wherein the audio communication is generated by the transmitter on-board the aircraft and is indicative of a state of distress.

18. The method of claim 17, wherein the predefined set of movements is representative of a Morse code message.

19. The method of claim 15, wherein the audio communication is generated by the audio device on-board the aircraft and is indicative of a behavior of a user wearing the headset.

20. The method of claim 19, wherein the audio device is a speaker and the audio communication is an alert audible to the user.

21. The method of claim 20, wherein the predefined set of movements is indicative of a state of fatigue of the user.

* * * * *